United States Patent [19]

Inaba

[11] Patent Number: 5,428,418
[45] Date of Patent: Jun. 27, 1995

[54] OPERATION SWITCH OF ZOOM LENS CAMERA

[75] Inventor: Toshiya Inaba, Tokyo, Japan

[73] Assignee: Asahi Kogaku Kogyo Kabushiki Kaisha, Tokyo, Japan

[21] Appl. No.: 258,368

[22] Filed: Jun. 10, 1994

Related U.S. Application Data

[63] Continuation of Ser. No. 852,571, Mar. 17, 1992, abandoned.

[30] Foreign Application Priority Data

Mar. 22, 1991 [JP] Japan .................. 3-132307

[51] Int. Cl.⁶ .............................. G03B 1/18
[52] U.S. Cl. .................. 354/195.12; 354/266; 354/268; 352/178
[58] Field of Search .......... 352/169, 174, 178; 354/195.12, 266, 268

[56] References Cited

U.S. PATENT DOCUMENTS

| | | | |
|---|---|---|---|
| 3,186,319 | 6/1965 | Hochstein | 352/178 |
| 4,206,982 | 6/1980 | Orsanai | 352/174 |
| 4,319,351 | 3/1982 | Fujimori et al. | |
| 4,440,403 | 4/1984 | Urano et al. | |
| 4,918,264 | 4/1990 | Yamamoto et al. | |
| 4,942,273 | 7/1990 | Furuhashi et al. | |
| 5,086,313 | 2/1992 | Misawa | |
| 5,089,677 | 2/1992 | Satou | |
| 5,118,912 | 6/1992 | Itabashi | |

FOREIGN PATENT DOCUMENTS

| | | |
|---|---|---|
| 0050085 | 4/1982 | European Pat. Off. |
| 0248716 | 12/1987 | European Pat. Off. |
| 68263 | 4/1893 | Germany . |
| 3334671 | 1/1984 | Germany . |
| 3433550 | 3/1986 | Germany . |
| 1187294 | 2/1993 | Germany . |
| 0369360 | 3/1932 | United Kingdom . |
| 0646481 | 11/1950 | United Kingdom . |
| 700533 | 12/1953 | United Kingdom . |
| 0930875 | 7/1963 | United Kingdom . |
| 0967959 | 8/1964 | United Kingdom . |
| 1207985 | 10/1970 | United Kingdom . |
| 1252456 | 11/1971 | United Kingdom . |
| 1474002 | 5/1977 | United Kingdom . |
| 1546096 | 5/1979 | United Kingdom . |
| 2164472 | 3/1986 | United Kingdom . |
| 2205666 | 12/1988 | United Kingdom . |
| 89/06022 | 6/1989 | WIPO . |

OTHER PUBLICATIONS

British Search Report.
French Search Report and Annex.

*Primary Examiner*—Monroe H. Hayes
*Attorney, Agent, or Firm*—Sandler, Greenblum & Bernstein

[57] ABSTRACT

An operational switch includes a switch member which is moved between an operative position, in which an associated battery circuit is turned ON, and an inoperative position, in which the battery circuit is turned OFF. A switching device operates in accordance with the rotation of the switch member, when the latter is in the operative position.

21 Claims, 12 Drawing Sheets

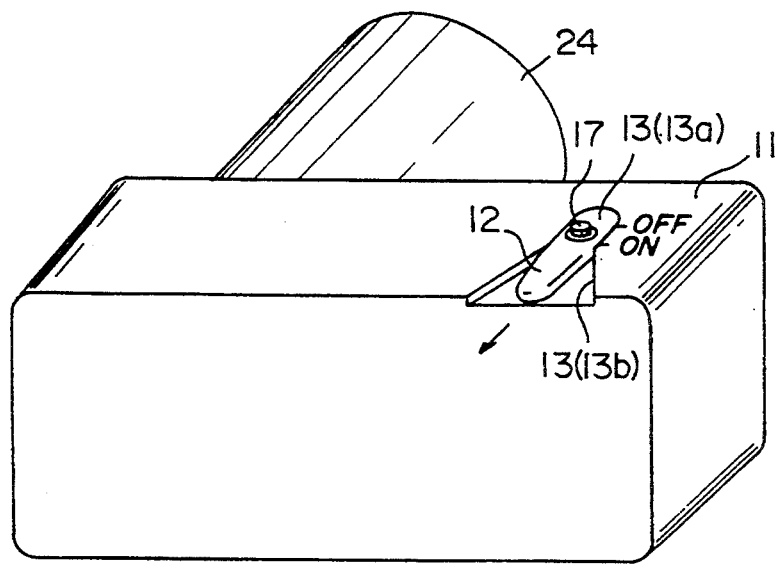
FIG. IA
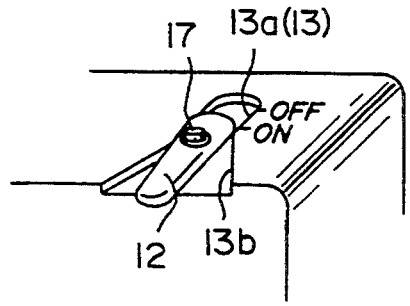
FIG. IB
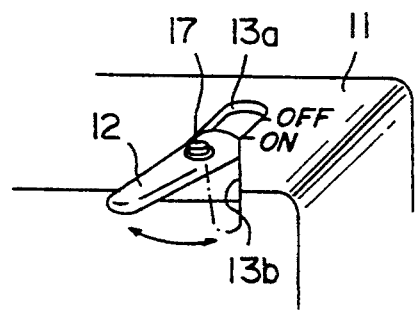
FIG. IC

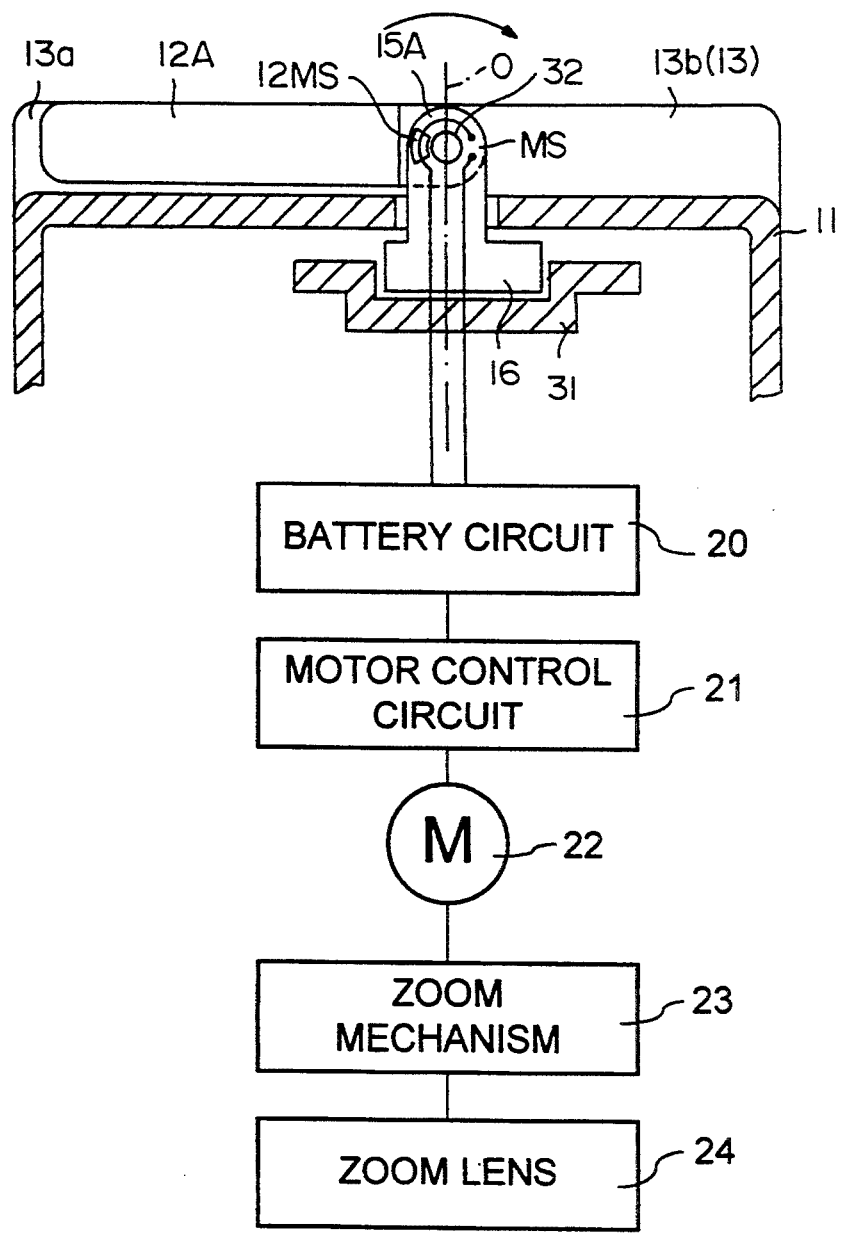

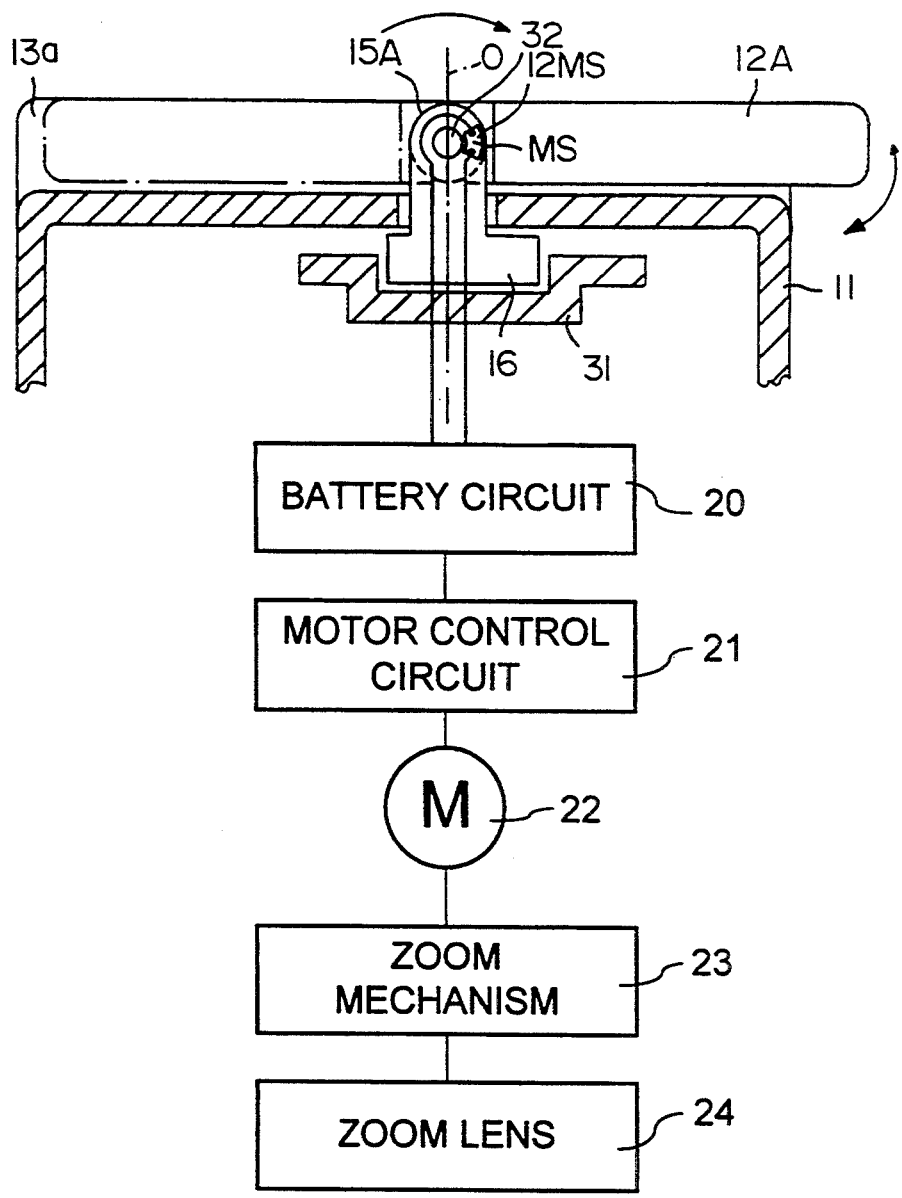

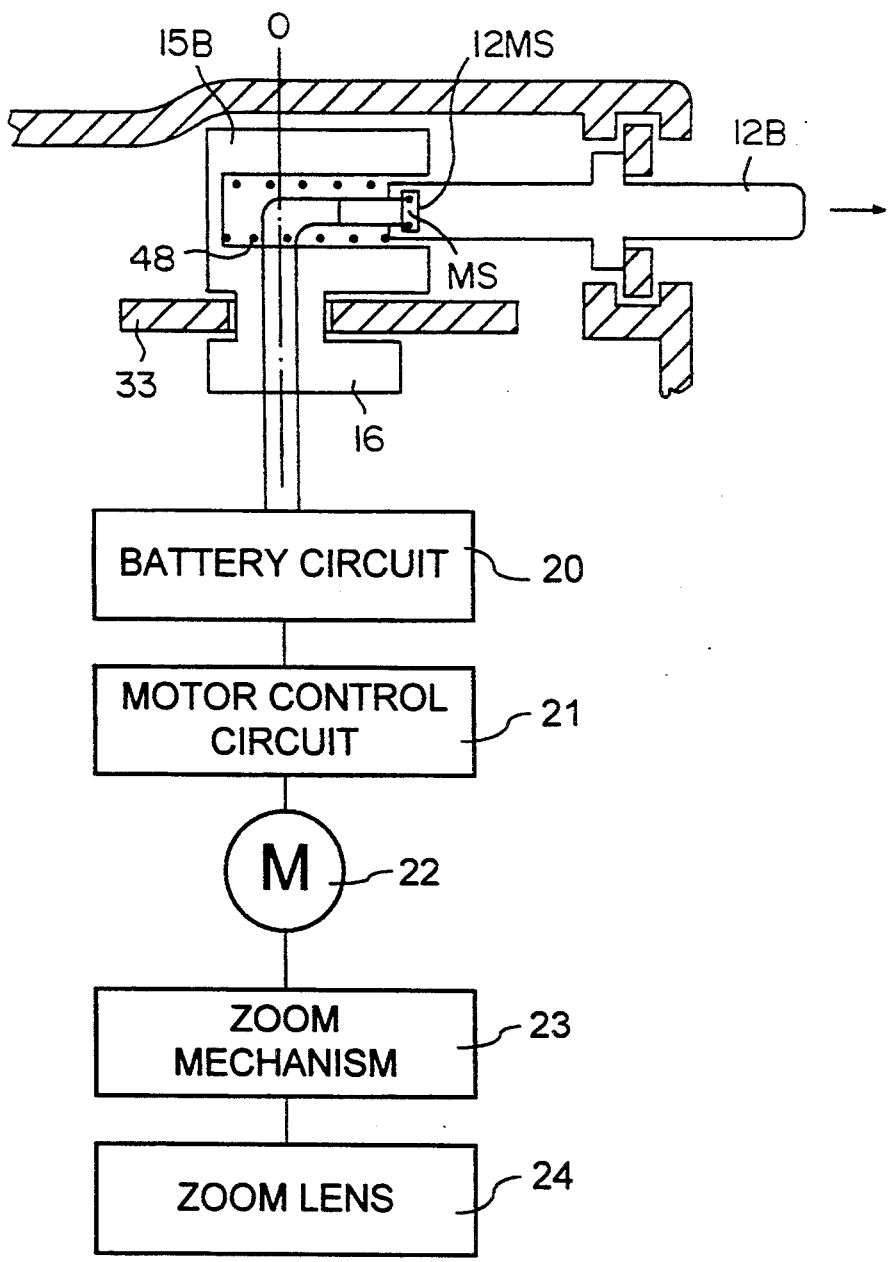

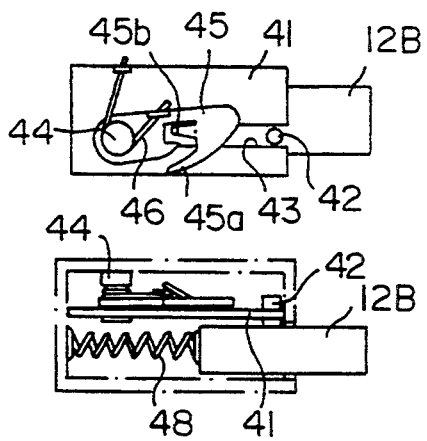
FIG. 10A1
FIG. 10A2
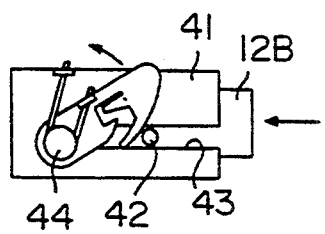
FIG. 10B
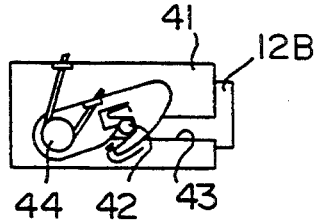
FIG. 10C
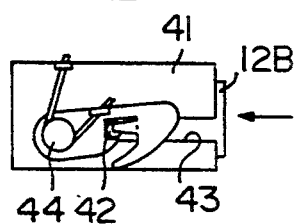
FIG. 10D
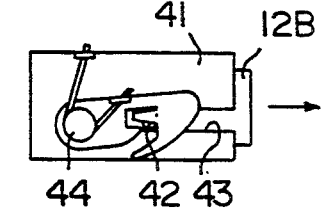
FIG. 10E1
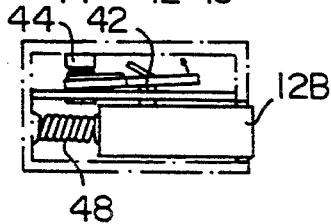
FIG. 10E2
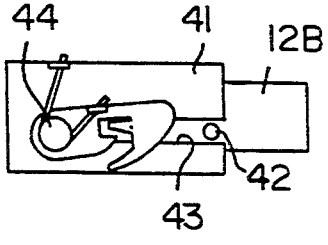
FIG. 10F

OPERATION SWITCH OF ZOOM LENS CAMERA

This application is a continuation of application Ser. No. 07/852,571, filed Mar. 17, 1992, now abandoned.

BACKGROUND OF THE INVENTION

1. Field of the Invention

The present invention relates to a single operational switch which can be advantageously used, for example, in a zoom lens camera.

2. Description of Related Art

In a recent camera having a motor driven zoom lens, a zooming motor is rotated in the forward and reverse directions by a zoom switch. Furthermore, in a known camera having an automatic photometer or an automatic exposure device, etc., a main switch is provided in addition to the zoom switch. In an intelligent camera having various functions, various function switches are also provided. However, in recent compact cameras, the space for such switches is limited due to the growing need for smaller cameras.

SUMMARY OF THE INVENTION

The primary object of the present invention is to provide a single operational switch which can be commonly used, for example, as a main switch and as a zoom switch in a motor driven zoom lens camera.

To achieve this object, according to the present invention, an operational switch is provided, which includes; a switch member that is movable between an operative position, in which a battery circuit is turned ON, and an inoperative position, in which the battery circuit is turned OFF. The said switch member is rotatable in the operative position, and a switch operation is actuated in accordance with the rotation of the switch member when the latter is in the operative position.

The invention can be applied to a motor-driven zoom lens camera having a battery circuit for the zoom lens motor drive, and which requires a switch for rotating the zoom motor of the zoom lens in the forward and reverse directions.

The switch member can be realized by a single switch member which is linearly movable between the operative position and the inoperative position, or which is rotatable about a horizontal axis between the operative position and the inoperative position.

Preferably, the switch member has a front end which is retracted forwardly with respect to the camera body, and a rear end which projects rearwardly from the camera body when the battery circuit is turned OFF and ON, respectively.

The projection of the rear end of the switch member from the rear of the camera body when the battery is turned ON not only improves the zooming operability, but also warns the photographer that the battery power is being unnecessarily consumed.

Furthermore, the retraction of the switch member into the camera body ensures a compactness of the camera when it is not in use.

According to another aspect of the present invention, an operational switch is provided which includes a rotatable shaft, a switch member which is rotatable about an axis of the rotatable shaft, a supporting mechanism for supporting the rotatable shaft so as to move in a direction perpendicular to the axis thereof, a first switching mechanism which operates in accordance with the movement of the rotatable shaft, and a second switching mechanism which operates in accordance with the rotation of the switch member.

According to still another aspect of the present invention, an operational switch is provided which includes a rotatable shaft, a switch member which is supported by the rotatable shaft so as to rotate about a second shaft perpendicular to the axis of the rotatable shaft, a first switching mechanism which operates in accordance with the rotation of the switch member about the second shaft, and a second switching mechanism which operates in accordance with the rotation of the rotatable shaft.

An operational switch according to still another aspect of the present invention has a rotatable shaft, a switch member which is supported on the rotatable shaft so as to linearly move in a direction perpendicular to the axis thereof, a first switching mechanism which operates in accordance with the movement of the switch member with respect to the rotatable shaft, and a second switching mechanism which operates in accordance with the rotation of the rotatable shaft.

The present disclosure relates to subject matter contained in Japanese patent application No. 03-132307 (filed on Mar. 22, 1991) which is expressly incorporated herein by reference in its entirety.

BRIEF DESCRIPTION OF THE DRAWINGS

The invention will be described below in detail with reference to the accompanying drawings, in which;

FIGS. 1A, 1B and 1C are perspective views of an operational switch of a zoom lens camera shown in different operational positions, according to an embodiment of the present invention;

FIGS. 7A and 7B are longitudinal sectional views of the operational switch shown in FIGS. 4A and 4B in connection with block diagrams of a control unit thereof;

FIGS. 9A and 9B are longitudinal sectional views of the operational switch shown in FIGS. 8A, 8B and 8C in connection with block diagrams of a control unit thereof;

FIGS. 10A1, 10A2, 10B, 10C, 10D, 10E1, 10E2 and 10F are explanatory views showing the operation principle of the operational switch shown in FIGS. 8A, 8B and 8C in different operational positions.

DESCRIPTION OF THE PREFERRED EMBODIMENTS

Figure 2:
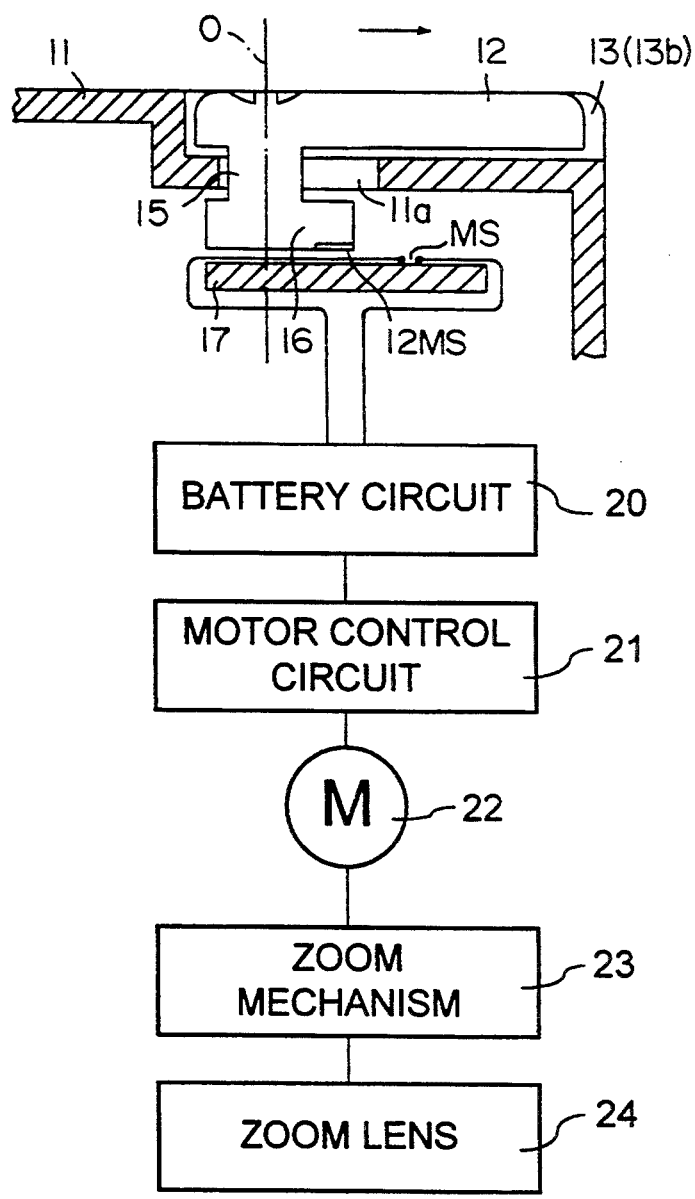
FIG. 2 is a longitudinal sectional view of the operational switch shown in FIGS. 1A through 1C in connection with a block diagram of a control unit thereof.
Figure 3A:
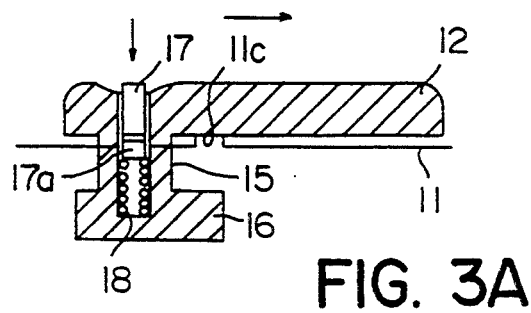
FIGS. 3A, 3B, 3C and 3D are longitudinal sectional views of an operational switch taken along another sectional line and shown in different operational positions.
Figure 3B:
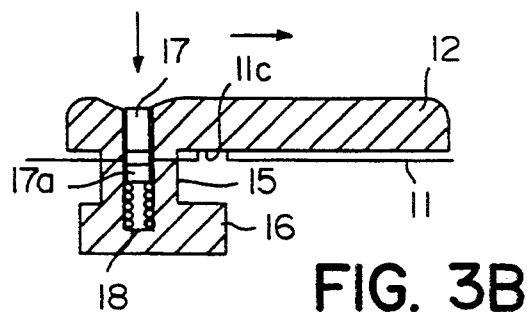
Figure 3C:
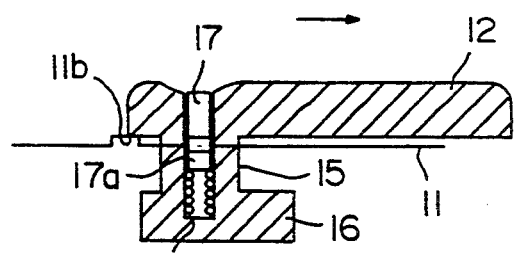
Figure 3D:
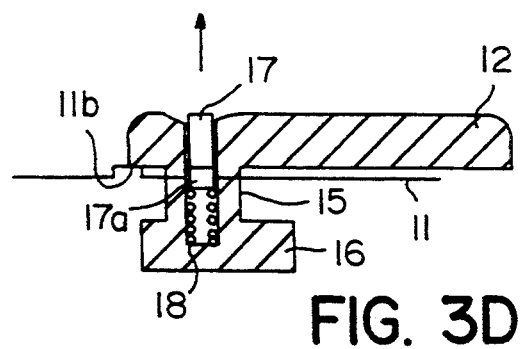
Figure 3E:
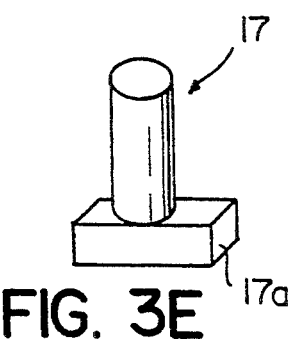
FIG. 3E is a perspective view of a switch button associated with the operational switch.

FIGS. 1 (1A, 1B, 1C) through 5 (5A, 5B, 5C) show a first embodiment of an operational switch according to the present invention.

A camera body 11 has a switch member 12 provided on the right end of an upper surface thereof as viewed from the back of the camera body 11. The switch member 12 is located in a recess 13 formed on the upper surface of the camera body 11. The recess 13 has a front linear portion 13a and a rear sector portion 13b connected to the linear portion 13a, so that the switch member 12 can be linearly moved in and along the front linear portion 13a of the recess 13. When the switch member 12 is moved rearwardly in the recess 13 along the front linear recess portion 13a, the switch is turned ON (operative position), so that the switch member 12 can be rotated in the sector recess portion 13b. In the operative position, the rear end of the switch member 12 projects outwardly from the sector recess portion 13b, as well as the camera body 11. On the other hand, when the switch member 12 is moved forwardly in and along the linear recess portion 13a to an inoperative position (OFF), the switch member 12 will not rotate and the front end of the switch member 12 is retracted into the recess 13.

The switch member 12 is provided on its front end with a rotatable shaft 15 and a switch leg 16 which is integral with a lower end of the rotatable shaft 15. The rotatable shaft 15 is linearly movable in and along a linear guide groove 11a formed in the camera body 11. The camera body 11 has therein a button 17 opposed to the switch leg 16 and is provided with a main switch MS which is turned ON and OFF by a main switch conductor piece 12MS of the switch leg 16. Namely, the main switch MS is turned ON to turn the camera battery circuit 20 ON by means of the conductor piece 12MS when the switch member 12 is moved rearwardly to a rear extremity along the linear guide groove 11a. Conversely, when the switch member 12 is moved forwardly to a frontal extremity, the main switch MS is turned OFF thereby turning the battery circuit 20 OFF.

FIGS. 3A through 3D show the consecutive steps incurred during locking and unlocking of a lock mechanism of the switch member 12, from a retracted position, in which the switch member 12 is retracted in recess 13, to a projecting position, in which the switch member 12 is projected from the rear of the camera body 11. The rotatable shaft 15 is provided on its center portion with a switch button 17, which is movable in the vertical direction. The switch button 17 is biased upwardly by a compression spring 18. The switch button 17 is provided with a stop projection 17a on the lower end thereof. The stop projection 17a projects in the radial direction (i.e., in the direction perpendicular to the sheet of the drawings in the illustrated embodiment). The camera body 11 is provided on its upper wall surface with engaging grooves 11b and 11c corresponding to the positions of the switch member 12 shown in FIGS. 1A and 1B, so that the stop projection 17a can be selectively engaged in the engaging grooves 11b and 11c. Consequently, when the switch button 17 is depressed to disengage the stop projection 17a thereof from the engaging groove 11b or 11c, the switch member 12 can slide forwards and backwards. When the switch button 17 is released at the front and rear extremities (sliding positions), the stop projection 17a can be engaged in the corresponding engaging groove 11b or 11c by the compression spring 18 to be locked in the ON or OFF positions.

The battery circuit 20 of the camera body is connected to a zoom motor 22 through a motor control circuit 21. The zoom motor 22 is connected to a zoom mechanism 23 which drives a zoom lens 24 into a telephoto position or a wide angle position in accordance with the forward or reverse direction of the zoom motor 22, as is well known.

Figure 4A:
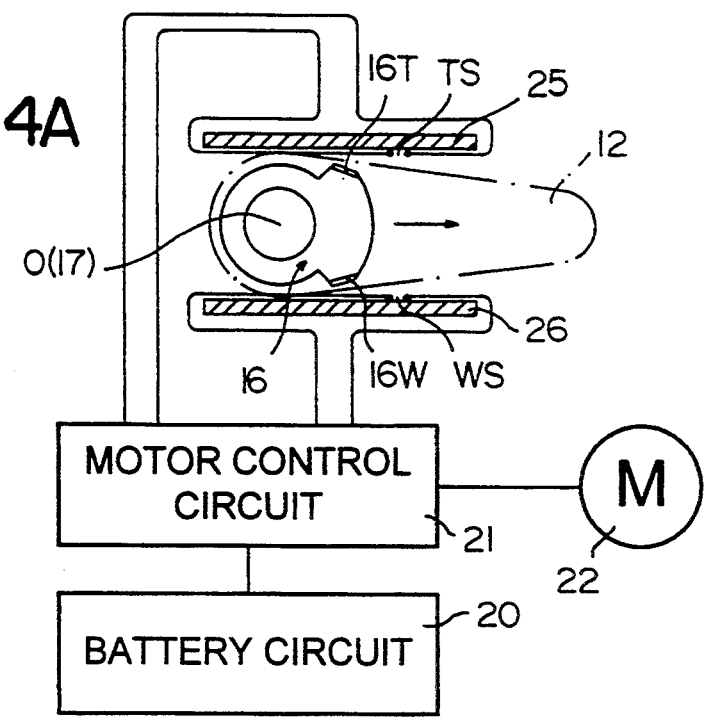
FIGS. 4A and 4B are cross sectional plan views of the operational switch shown in FIGS. 1A through 1C in connection with block diagrams of a control unit thereof.
Figure 4B:
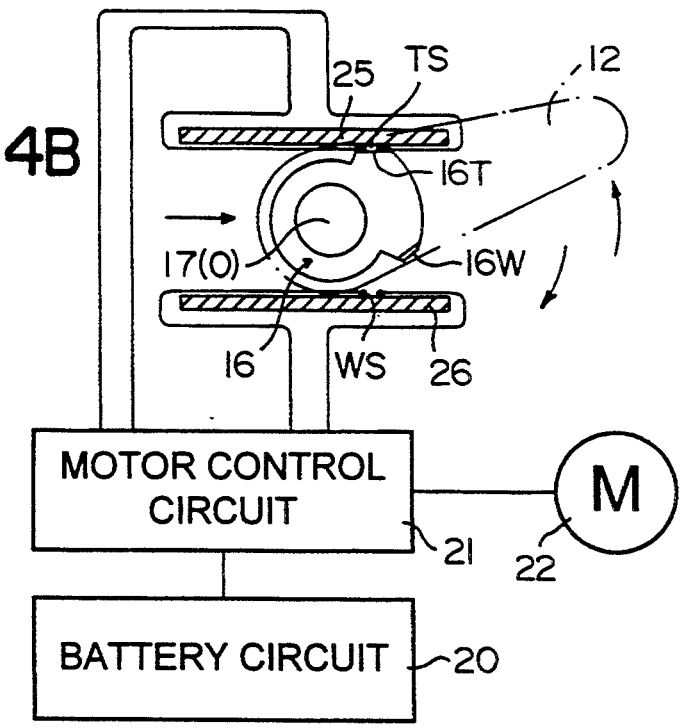

The following discussion will be directed to a zoom switch which is realized when the switch member 12 is turned ON, with reference to FIGS. 4A and 4B.

A telephoto switch substrate 25 and a wide-angle switch substrate 26 are provided within the camera body 11 on opposite sides of the switch member 12 (switch leg 16) as can be seen in a plan view. The telephoto switch substrate 25 and the wide-angle switch substrate 26, are provided thereon with a telephoto switch TS and a wide-angle switch WS, respectively. Both telephoto switch TS and wide-angle switch WS are connected to the motor control circuit 21. The telephoto switch TS and the wide-angle switch WS are turned ON and OFF by a telephoto switch conductor piece 16T and a wide-angle switch conductor piece 16W, which are each provided on the switch leg 16, on the respective side nearer the respective switch. Namely, when the switch member 12 is rotated when in the rearwardly projecting position shown in FIG. 5B, the telephoto switch TS or the wide-angle switch WS is selectively turned ON by the telephoto-switch conductor piece 16T or the wide-angle switch conductor piece WS depending on the direction of rotation. When the telephoto switch TS is turned ON, the motor control circuit 21 rotates the zoom motor 22 in the telephoto direction to thereby increase the focal length of the zoom lens through the activation of the zoom mechanism 23. On the other hand, when the wide-angle switch WS is turned ON, the motor control circuit 21 rotates the zoom motor 22 in the wide-angle direction to thereby shorten the focal length of the zoom lens through the activation of the zoom mechanism 23.

Consequently, when the switch member 12 is moved rearwardly from the OFF position of the main switch MS shown in FIG. 1A to the operative position shown in FIG. 1B, the main switch MS is turned ON by the conductor piece 12MS. In this state, the switch member 12 projects from the rear of the camera body 11, so that the switch member 12 can be rotated about an axis O of the shaft 15 within the sector recess portion 13b. Thereafter, when the switch member 12 is rotated to the left or right, the telephoto switch TS or the wide-angle switch WS is selectively turned ON by the telephoto switch conductor piece 16T or the wide-angle switch conductor piece 16WS, respectively, thereby carrying out the zooming operation. When the switch member 12 is moved forward along the linear guide groove 11a, the switch leg 16 is separated from the main switch MS, so that the latter is turned OFF, thereby inactivating the camera battery circuit 20.

Figure 5A:
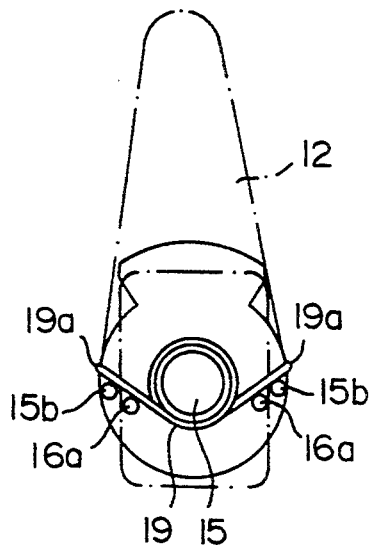
FIGS. 5A and 5B are plan views of a returning mechanism for returning the operational switch, shown in different operational positions in FIGS. 1A through 1C, to a neutral position.
Figure 5B:
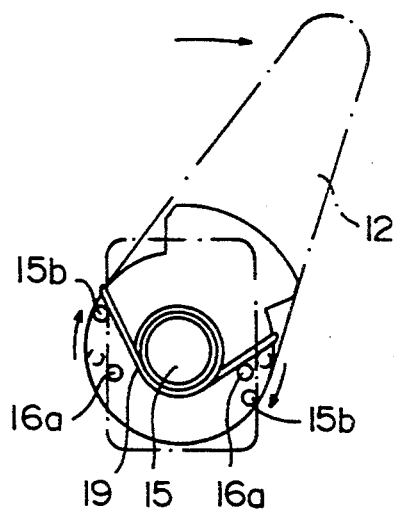
Figure 5C:
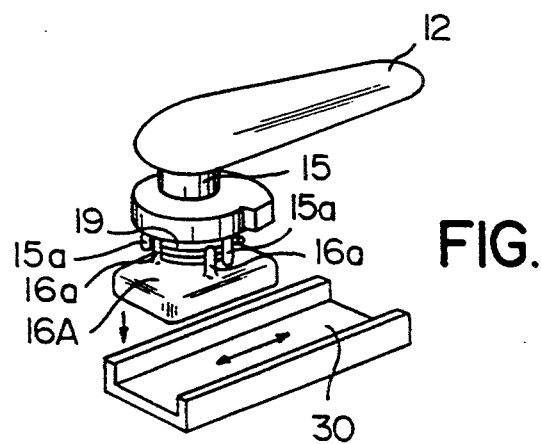
FIG. 5C is an exploded perspective view of the returning mechanism shown in FIGS. 5A and 5B.

A neutral position returning mechanism is provided between the camera body 11 and the shaft 15 of the switch member 12 to return the switch member 12 to a neutral position where the switch member 12 is aligned with the longitudinal axis of the linear guide groove 11a when no external force is exerted on the switch member 12, as shown in FIGS. 5A, 5B and 5C. A torsion coil spring 19 wound around the rotatable shaft 15 of the switch member 12 is engaged at opposite ends 19a thereof by a pair of movable pins (rotatable pins) 15b provided on the switch member 12 and a pair of stationary pins 16a provided on an immovable part of the camera body.

Consequently, when no rotational force is applied to the switch member 12, the latter is kept in the neutral position. At which position the end legs 19a of the torsion coil spring 19 come into contact with both of the movable pins 15b and the stationary pins 16a, as shown in FIG. 5A. If the switch member 12 is rotated from the neutral position, stress is applied to the associated leg 19a of the torsion coil spring 19, so that the switch member 12 is biased toward the neutral position, as shown in FIG. 5B. The rotatable shaft 15 of the switch member 12 and the stationary pins 16a are provided on a slider 16A which is slidable in and along a slide groove 30, as shown in FIG. 5C.

Although the main switch MS, the telephoto switch TS and the wide-angle switch WS are directly connected to each other by the conductor pieces provided on the switch leg 16 in the illustrated embodiment, it is possible to provide additional conductor members therebetween which are displaced by the switch leg 16.

Figure 6A:
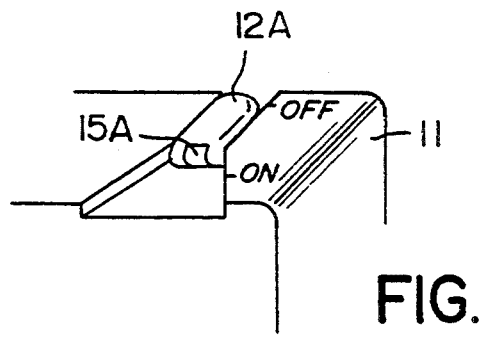
FIGS. 6A, 6B and 6C are perspective views of an operational switch of a zoom lens camera shown in different operational positions, according to another embodiment of the present invention.

FIGS. 6 (6A, 6B, 6C) and 7 (7A, 7B) show a second embodiment of the present invention, in which the main switch MS is turned ON and OFF by the rotation of the switch member 12A. The camera body 11 is provided thereon with a recess 13 having a linear recess portion 13a and a sector recess portion 13b, similar to the first embodiment. The camera body 11 has a rotatable shaft 15A located in the vicinity of the boundary of the linear recess portion 13a and the sector recess portion 13b. The rotatable shaft 15A is rotatably supported on a support 31 in the camera body 11 so as to rotate about a vertical axis O thereof. The upper end of the rotatable shaft 15A projects into the recess 13 and is provided therein with a lateral shaft 32 extending in the horizontal direction. The switch member 12A is rotatably attached to the lateral shaft 32, so that the switch member 12A can rotate about an axis of the lateral shaft 32 to be selectively moved into either the linear recess portion 13a or the sector recess portion 13b. When the switch member 12A is in the linear recess portion 13a, the switch member 12A does not project from the configuration of the camera body 11. Conversely, when the switch member 12A is moved into the sector recess portion 13b, the rear end of the switch member 12A projects from the rear end of the camera body 11. Accordingly, the lateral shaft 32 is located closer to the rear end of the camera body 11 with respect to the center in the direction of the camera body thickness.

The main switch MS, which is provided in the rotatable shaft 15, is turned ON and OFF when the switch member 12A is in the linear recess portion 13a, and the sector recess portion 13b, respectively. Namely, the switch member 12A is provided with a main switch conductor piece 12MS which has a rotational relationship with the axis 32, so that the main switch MS is turned ON by the conductor piece 12MS when the switch member 12A is rotated to the operative (ON) position.

The switch member 12A is rotatable about the vertical axis O of the shaft 15A when it is in the sector recess portion 13b, similar to the first embodiment, so that when the switch member 12A is rotated in the left and right directions, the telephoto switch TS or the wide-angle switch WS is selectively turned ON. The actuating mechanism of the telephoto switch TS and the wide-angle switch WS is realized by the switch mechanism shown in FIGS. 4A and 4B.

Figure 6B:
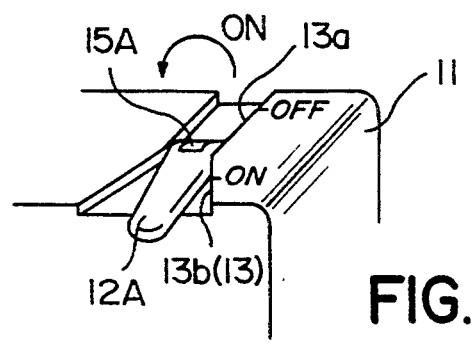
Figure 6C:
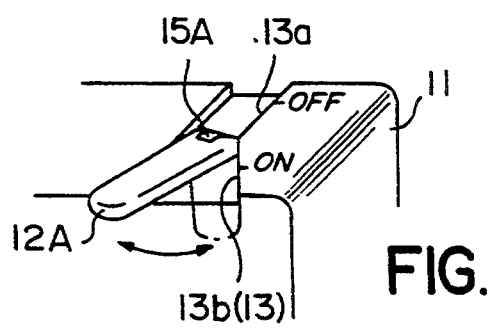

According to the second embodiment, when the switch member 12A is rotated about the axis of the lateral shaft 32, thereby moving the latter into the linear recess portion 13a, or the sector recess portion 13b, the main switch MS is turned OFF and ON, respectively. In the ON position of the main switch MS, as shown in FIGS. 6B and 7B, the switch member 12A is rotated within the sector recess portion 13b, as shown in FIG. 6C to effect the zooming operation, as shown in FIGS. 4A and 4B.

Figure 8A:
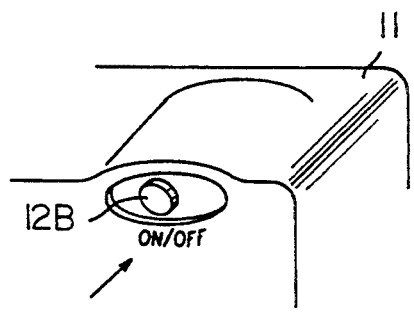
FIGS. 8A, 8B and 8C are perspective views of an operational switch of a zoom lens camera shown in various operational positions, according to still another embodiment of the present invention.
Figure 8B:
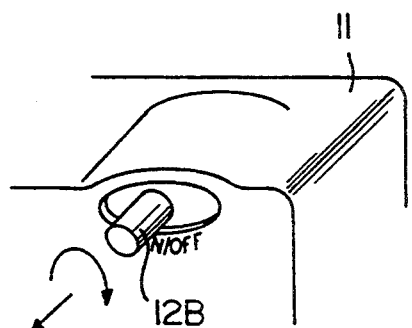
Figure 8C:
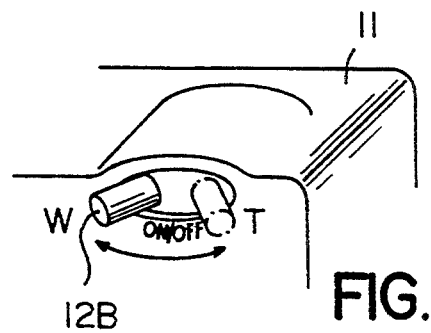
Figure 9A:
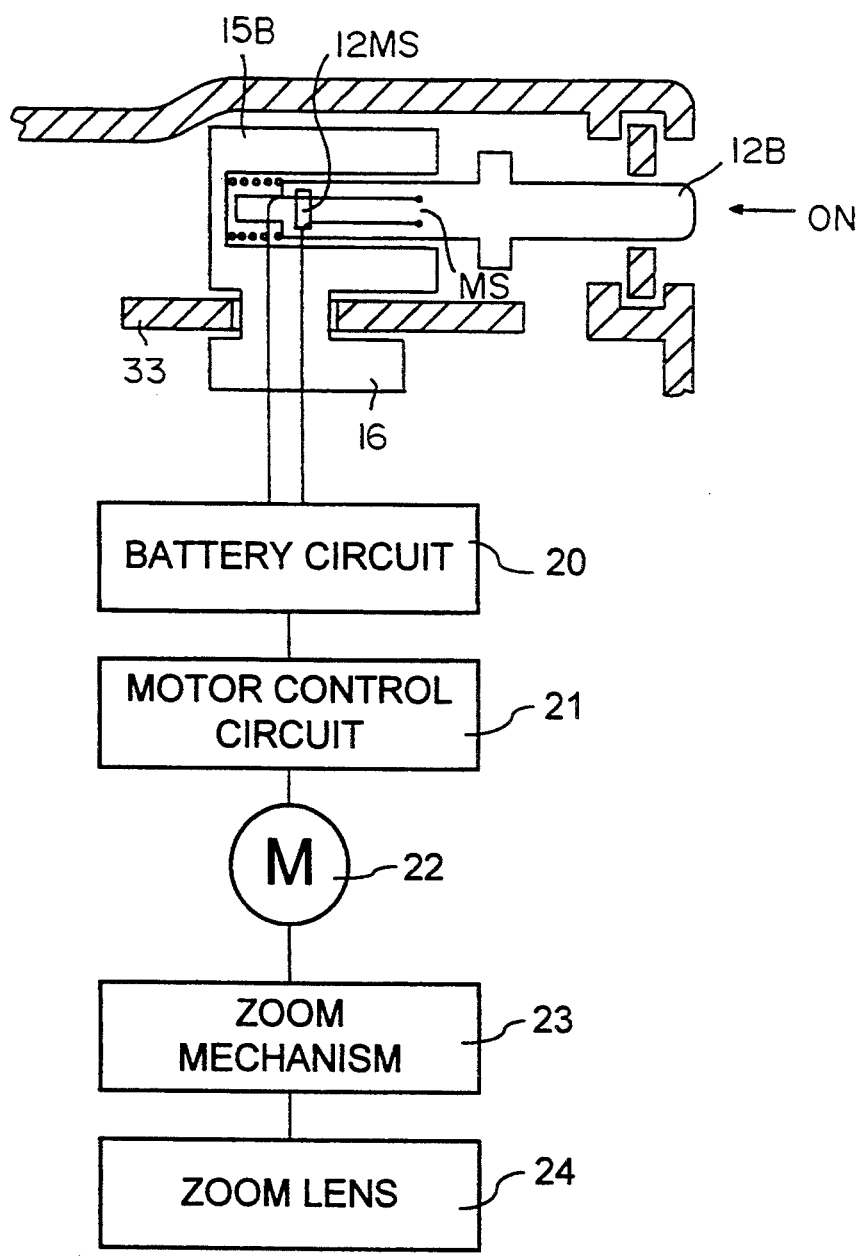

FIGS. 8 (8A, 8B, 8C) through 10 (10A1–10F) show a third embodiment of the present invention, in which the switch member 12B is realized by a push button. The switch member 12B is located on the upper right end of the rear surface of the camera body 11. Every time the switch member 12B is depressed, the switch member is alternately moved to a retracted and locked position (FIG. 8A) or to a projecting position (FIG. 8B). In the projecting position shown in FIG. 8B, the switch member 12B can be rotated, as shown in FIG. 8C.

FIGS. 10A1 through 10E show an actuating mechanism for moving the switch member 12B between the retracted position and the projecting position, by way of example.

The switch member 12B is slidably guided by a guide member 41 which has therein a guide groove 43 in which a guide pin 42 projecting from the switch member 12B in the radial direction is fitted. The guide member 41 has an engaging lever 45 rotatably supported on a shaft 44. The engaging lever 45 is provided with a locking leg 45a and a returning leg 45b. The engaging lever 45 is biased to rotate by a torsion spring 46, so that the returning leg 45b is located above the guide groove 43. The switch member 12B is also biased by a compression spring 48 to project outwardly. The returning leg 45b is bent upward, as can be seen in FIGS. 10A2 and 10E2.

In the actuating mechanism as constructed above, when the switch member 12B is depressed, while in the projecting position shown in FIGS. 10A1 and 10A2, the guide pin 42 pushes the locking leg 45a to thereby rotate the engaging lever 45 against the torsion spring 46, so that the locking leg 45a engages with the guide pin 42 (FIGS. 10B and 10C). In this state, the switch member 12B is stably held in the retracted position. When the switch member 12B is again depressed, the guide pin 42 moves underneath the returning leg 45b and raises the engaging lever 45 due to play between the shaft 44 and the engaging lever 45, thereby disengaging the guide pin 42 from the locking leg 45a (FIGS. 10E1 and 10E2). As a result, the switch member 12B is returned to the projecting position by the spring force of the compression spring 48 (FIG. 10F).

The switch member 12B is supported by the rotatable shaft 15B which is supported on a support 33 so as to rotate about a vertical axis O thereof, so that the switch member 12B is linearly movable along a longitudinal axis thereof to project and retract. The main switch MS is provided in the rotatable shaft 15B and is turned ON and OFF by the main switch conductor piece 12MS provided on the switch member 12B. The main switch MS is turned OFF and ON by the conductor piece 12MS when the switch member 12B is in the retracted position and the projecting position shown in FIG. 9A and FIG. 9B, respectively.

When the switch member 12B is in the projecting position shown in FIG. 9B, it can be rotated about the axis O of the rotatable shaft 15B to alternately turn ON the telephoto switch TS or the wide-angle switch WS, similar to the first and second embodiments. The actuating mechanism of the telephoto switch TS and the wide-angle switch WS in the third embodiment is similar to that which is shown in FIGS. 4A and 4B.

According to the third embodiment mentioned above, when the switch member 12B is moved to the retracted position and the projecting position, the main switch MS is turned OFF and ON, respectively. When the main switch MS is in the ON position, as shown in FIGS. 8B and 9B, the switch member 12B can be rotated to effect the zooming operation, as shown in FIGS. 4A and 4B.

As can be understood from the above discussion, according to the present invention, a switch for actuating the battery circuit and a switch for effecting the zooming can be realized by a single switch member, thus resulting in a smaller space necessary for the switches. This is advantageous particularly in a compact and multi-functional camera. If the switch member is projected backward from the camera body when the battery circuit is activated, the zooming operability can be increased. Furthermore, since the projection of the switch member from the camera body makes the photographer immediately aware that the power switch is turned ON, the battery power which would otherwise be wasted can be saved.

I claim:

1. An operational switch in a camera body having a motor-driven zoom lens comprising:
    a switch member which is rotatable between an ON position and an OFF position about a first axis provided on said camera body;
    a recess in said camera body comprising a linear recess portion and a sector recess portion opposite said linear recess portion, wherein said switch member is positioned in said linear recess portion when in said OFF position, and said switch member is rotatable to be oppositely positioned in said sector recess portion to be in said ON position; and
    said switch member being further rotatable about a second axis only when said switch member is positioned in said ON position, said linear recess portion preventing rotation of said switch member about said second axis when said switch member is in said OFF position;
    wherein rotation of said switch member about said second axis actuates zooming of said motor-driven zoom lens such that rotation in one direction about said second axis performs zooming in a tele to wide direction, and rotation in a direction about said second axis opposite to said one direction performs zooming in a wide to tele direction, and wherein said second axis is normal to said first axis;
    said sector recess portion comprising a substantially planar surface which guides said rotation of said switch member about said second axis such that said switch member rotates in a plane which is substantially parallel with said substantially planar surface.

2. An operational switch according to claim 1, further comprising a battery circuit for said motor driven zoom lens, said battery circuit being turned ON and OFF when said switch member is positioned at said ON position and said OFF position, respectively.

3. An operational switch according to claim 1, wherein said recess is positioned in a top surface of said camera body.

4. An operational switch according to claim 3, wherein said switch member rotates in a plane substantially parallel to said top surface of said camera body when said switch member rotates about said second axis.

5. An operational switch for a camera body having a motor-driven zoom lens comprising:
    a first rotatable shaft located on said camera body;
    a switch member which is supported by said rotatable shaft and which is rotatable between an ON position and an OFF position about a second shaft which defines a first axis perpendicular to said first rotatable shaft;
    a recess in said camera body comprising a linear recess portion and a sector recess portion opposite said linear recess portion, wherein said switch member is positioned in said linear recess portion when in said OFF position, and said switch member is rotatable to be oppositely positioned in said sector recess portion to be in said ON position;
    said switch member being further rotatable about a second axis defined by said first rotatable shaft only when said switch member is positioned at said ON position, said linear recess portion preventing rotation of said switch member about said second axis when said switch member is in said OFF position, wherein rotation of said switch member about said second axis actuates zooming of said motor-driven zoom lens such that rotation in one direction about said second axis performs zooming in a tele to wide direction, and rotation in a direction about said second axis opposite to said one direction performs zooming in a wide to tele direction, said sector recess portion comprising a substantially planar surface which guides said rotation of said switch member about said second axis such that said switch member rotates in a plane which is substantially parallel with said substantially planar surface;
    a first switch mechanism for operating in accordance with the rotation of said switch member about said first axis; and,
    a second switch mechanism for operating in accordance with the rotation of said rotatable shaft.

6. An operational switch according to claim 5, wherein said shaft is rotatable by said switch member.

7. An operational switch according to claim 5, wherein said recess is positioned in a top surface of said camera body.

8. An operational switch according to claim 7, wherein said switch member rotates in a plane substantially parallel to said top surface of said camera body when said switch member rotates about said second axis.

9. An operational switch according to claim 5, further comprising:
    a battery circuit for said motor driven zoom lens, said battery circuit being turned ON and OFF when said switch member is positioned at said ON position and said OFF position, respectively.

10. An operational switch according to claim 5, wherein said second switch mechanism comprises a zoom switch for zooming said motor-driven zoom lens.

11. An operational switch according to claim 10, wherein said second shaft comprises a lateral shaft provided on an upper surface of said camera body.

12. An operational switch according to claim 11, wherein said switch member is retracted into said camera body and projects from a rear surface of said camera body when said switch member is rotated to a forward position and a rearward position about said second shaft, respectively.

13. An operational switch for a camera body having a motor-driven zoom lens comprising:
  a switch member having first and second switch mechanisms wherein said switch member is rotatable about a first axis between an ON position and an OFF position;
  a battery circuit for said motor-driven zoom lens, said battery circuit being turned ON and OFF when said switch member is positioned at said ON position and said OFF position, respectively; and
  a recess in said camera body comprising a linear recess portion and a sector recess portion opposite said linear recess portion, wherein said switch member is positioned in said linear recess portion when in said OFF position, and said switch member is rotatable to be oppositely positioned in said sector recess portion to be in said ON position;
  said switch member operating said second switch mechanism in accordance with rotation of said switch member and a rotatable shaft about a second axis, perpendicular to said first axis and defined by said rotatable shaft, only when said switch member is positioned at said ON position, said linear recess portion preventing rotation of said switch member about said second axis when said switch member is in said OFF position;
  wherein rotation of said switch member and said rotatable shaft about said second axis actuates zooming of said motor-driven zoom lens such that rotation in one direction about said second axis performs zooming in a tele to wide direction, and rotation in a direction about said second axis opposite to said one direction performs zooming in a wide to tele direction.

14. An operational switch according to claim 13, wherein said sector recess portion comprises a substantially planar surface which guides said rotation of said switch member about said second axis such that said switch member rotates in a plane which is substantially parallel with said substantially planar surface.

15. An operational switch according to claim 13, wherein said recess is positioned in a top surface of said camera body.

16. An operational switch according to claim 15, wherein said switch member rotates in a plane substantially parallel to said top surface of said camera body when said switch member rotates about said second axis.

17. An operational switch according to claim 13, further comprising:
  a linear recess in said camera body for preventing operation of said second switch member about said second axis when said switch member is in said OFF position.

18. An operational switch for a camera body having a motor-driven zoom lens comprising:
  a switch member having first and second switch means, wherein said switch member is rotatable between an operative position in which an associated battery circuit is turned ON by said first switch means and an inoperative position in which said battery circuit is turned OFF by said first switch means;
  a recess in said camera body comprising a linear recess portion and a sector recess portion opposite said linear recess portion, wherein said switch member is positioned in said linear recess portion when in said inoperative position, and said switch member is rotatable to be oppositely positioned in said sector recess portion to be in said operative position;
  said switch member operating said second switch means in accordance with the rotation of said switch member when said switch member is in the operative position;
  wherein said linear recess portion in the camera body prevents operation of said second switch means when said switch member is in the inoperative position, and said sector recess portion permits said switch member to operate said second switch means when said switch member is in the operative position.

19. An operational switch according to claim 18, wherein said sector recess portion comprises a substantially planar surface which guides said rotation of said switch member in said operative position, wherein said switch member rotates in a plane which is substantially parallel with said substantially planar surface.

20. An operational switch according to claim 18, wherein said recess is positioned in a top surface of said camera body.

21. An operational switch according to claim 20, wherein said switch member rotates in a plane substantially parallel to said top surface of said camera body when said switch member operates said second switch means.

* * * * *